Figure 1:
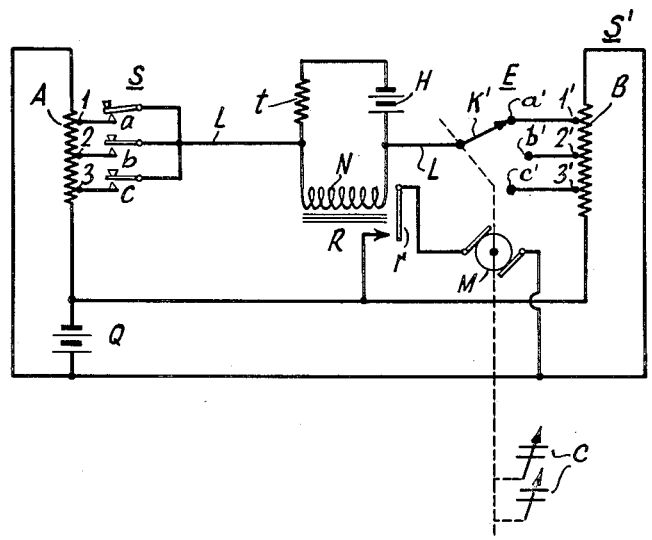

Oct. 31, 1939.　　G. VOGT ET AL　　2,177,850
REMOTE CONTROL MEANS
Filed June 4, 1938　　2 Sheets-Sheet 1

INVENTORS
GOTTFRIED VOGT
HANS STIERHOF
BY
ATTORNEYS

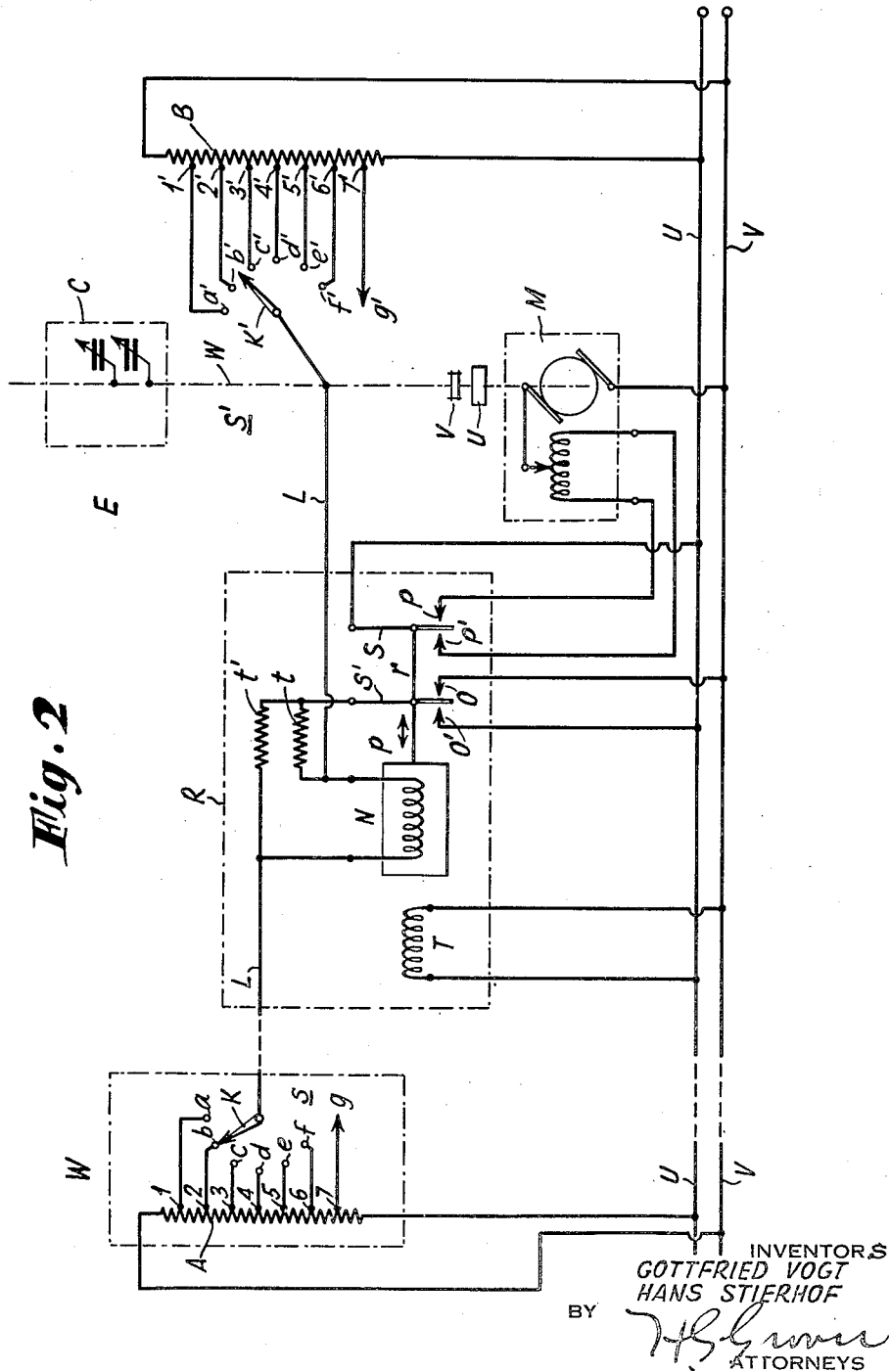

Patented Oct. 31, 1939

2,177,850

UNITED STATES PATENT OFFICE 2,177,850

REMOTE CONTROL MEANS

Gottfried Vogt, Berlin-Tempelhof, and Hans Stierhof, Berlin-Charlottenburg, Germany, assignors to Telefunken Gesellschaft für Drahtlose Telegraphie m. b. H., Berlin, Germany, a corporation of Germany Application June 4, 1938, Serial No. 211,848
In Germany June 5, 1937

4 Claims. (Cl. 172—239)

Remote-control arrangements are known in the art which comprise a voltage divider both at the controlling point and at the controlled point which are inter-connected, and further a line between the two shiftable taps which, by way of a relay, actuates a motor connected with the wiper at the controlled point and with the device to be set. If the wiper at the controlling point is conductively united with a certain point of the corresponding voltage divider then, if the wiper at the controlled point is not yet located at the corresponding point of its voltage divider a voltage will arise at the relay which will cause the motor to be cut in circuit. But when the wiper coupled with the device to be adjusted and shifted by the action of the motor at the controlled place roughly has reached the desired position, the potential at the relay will drop to a point where the relay releases and the motor current is cut off, with the result that also the device to be set stays in the position it happens to occupy at the time.

However, an organization of this nature permits of only a rough setting. The reason of such imprecision of setting is that the relay does not release only when the wiper at the controlled place has reached the position where the relay potential is exactly equal to zero, but already a little sooner when the minimum voltage which will still hold the relay (holding or retaining value) is not reached. And this minimum potential is mostly not exactly reproducible.

A modified form of construction is also known in the art in which each of the two voltage dividers is furnished with a bank of fixed taps, and each of these taps, in turn, is connected with a row of stationary contacts. At the controlling place and at the controlled end a like number of fixed taps with the same resistance relation are provided. Each of the two wipers shifts on its corresponding bank or row of contacts which are correspondingly similarly spaced. Since in this arrangement the fixed contacts are very broad, and since also the breadth of the slide contact or slider is so great that the slide contact is always in physical contact with at least one of the fixed contacts, though frequently with two such fixed contacts, it follows that no exact adjustment will be possible with this arrangement.

Now, according to this invention a higher degree of precision is obtained by making the width of the slider at the controlled place less than the smallest distance of the contacts which are disposed in accordance with the pre-determined positions of the device and that corresponding taps on both voltage dividers divide these in the same resistance ratio, independently of the geometric disposition of the contacts; moreover a holding potential is impressed on the relay through a resistance which is high in contrast with the resistances of the voltage dividers.

The advantage of the invention is that the position of the sliding contact or slider at the controlled end at which release happens in the relay is exactly and reproducibly fixed by the position in which the slider happens to make conductive contact with the desired fixed contact. As a consequence the potential at the relay which in all positions of the sliding contact between two neighboring fixed contacts is always the same and which naturally is higher than the voltage required for holding is suddenly short-circuited. In other words, contradistinct to what is true of the arrangement hereinbefore mentioned from the prior art, the relay voltage does not fall continuously to the zero level, but this happens intermittently, and thus the limiting position is clearly fixed. As a matter of fact, a whole series of pre-arranged positions in the adjustable arrangement can be set with high precision.

Figure 3:
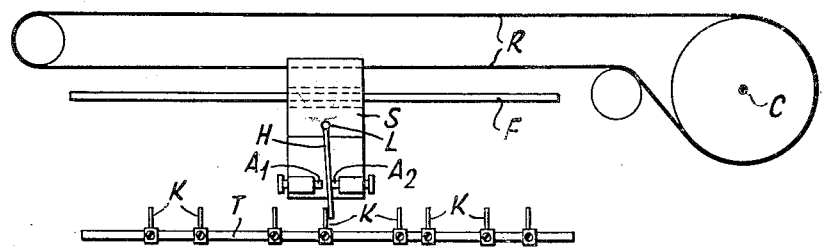

Certain exemplified embodiments of the invention are shown in the drawings wherein Fig. 1 illustrates in diagrammatic form a simplified circuit arrangement incorporating the invention using push-buttons; Fig. 2 illustrates an embodiment of the invention utilizing alternating current and wiping contacts; and, Fig. 3 illustrates a type of wiping contact device constructed in accordance with the present invention.

Referring to the drawings Fig. 1, S denotes the control device which may be mounted any desired distance apart from the receiver set proper. E denotes the control device to be disposed in the receiver set. A and B are voltage dividers provided at the controlling place and at the controlled place, the terminals of which are united with the source of D. C. supply Q.

Both voltage dividers or potentiometers have taps 1, 2, 3 and 1', 2', 3', which are brought to corresponding terminals a, b, c of a push button assembly s and a', b', c' of a multi-point switch S' respectively. Switch S' is provided with a wiper K'. The push button assembly and the sliding contact mounted on the wiper are united by the control or pilot line L which includes the relay R. As current flows therethrough the said relay closes the switch r and thereby makes the circuit for the setting motor M, the shaft of which, on the one hand, is connected through a gearing (not shown) with the wiper K', and, on the other hand, with the shaft of the rotary condenser C. In parallel relation to the winding N of relay R is connected the series arrangement comprising a D. C. source of voltage supply H and a resistance t whose value is high in contrast with the resistances of the voltage dividers A and B.

The operation of this arrangement is as follows: If the push-button happens to be depressed on contact b and the slider K' is in contact with the contact a', then there is impressed upon the coil N the voltage difference between points 2 and 1'; the result is that the switch r is actuated and the motor M set in motion in a definite direction. By the coupling also the rotary condenser C will be set and the wiper K' rotated. Now, as soon as the slider K' is no longer in touch with contact a', releasing of relay and arresting of motor are prevented owing to the fact that to the relay coil through resistance t is applied the source H which will then cause a constant current to flow through the relay coil. It is only at the instant when the wiper K' engages the contact b' that the current passing through the relay coil decreases by steps (intermittently) to a level which is practically zero so that the switch r is opened and the operation of setting is discontinued.

In the exemplified embodiment here shown, in the assumption that the relay is mounted at the controlled place, only three wires are required between the two points. One of these may be replaced by using the ground.

Fig. 2 shows another exemplified embodiment of the invention in which arrangements have been made so that the rotary condenser is always caused to assume the desired position by traveling the shortest possible way. In this arrangement the two voltage dividers A and B have their end terminals united with the A. C. mains U, V. Their taps 1 to 7 and 1' to 7' are brought to the corresponding terminals a to g and a' to g', respectively, of multi-point switches S, S', respectively, with wipers K and K'. Included in the control or pilot line L between the sliders is the polarized relay R. The energization of the relay is effected by way of the coil T connected with the mains or supply-line U, V. The solenoid N is directly contained in the pilot line L. United with the relay R are the retaining or holder contacts o, o', and the control contacts p, p'. While the holder contacts o, o', are connected with the line U, V, the control contacts p, p' are brought to the terminals of a motor M with reversible sense of rotation.

What may be used for the purpose is a motor of any desired system. The keeper P of relay T actuated by solenoid N is united with a two-pole switch r whose blades s and s' shift between the holding contacts o, o', and the control contacts p, p' respectively. The blade s is united with phase U of the mains, while blade s' is connected through a series resistance t and t' connected through a series resistance t and t' with the beginning and the end, respectively, of the solenoid N. The motor has a wheel gear u with which a clutch V is connected, with the drive shaft w of which is connected the wiper K' to the switch S', and further the rotary condensers C serving to change the wavelength of the radio apparatus.

The operation of the distant control selector is as follows:

If the wiper K of the selector W happens to be positioned on one of the contacts a—g, and the wiper K' of the switch S' upon the corresponding contact of bank a'—g', provided that the resistance and thus the voltage division on both potentiometers is the same, then no difference of potential will arise at the ends of the line L, and if the relay R is at rest, that is, if the switch contact blades s, s' are located midways between the contacts o, o', and p, p', respectively. If, then, for example, the wiper K is shifted away from contact b to contact c a difference of potential will be set up across the ends of line L, with the result that the coil N is energized.

As a result the keeper P the relay is moved outwardly whereby the switch blades s, s' are united with the contacts o and p. The closing of the control or piloting contact p has the result that the motor M is united with the phases U, V, of the supply mains, and is thus caused to revolve in a certain direction. The wiper K' of the switch S moves away from the contact b' in the direction towards the contact c'. Owing to the shift of wiper K' from the contact b', the difference of potential across the ends of the line L is removed. Then, however, the effect of the retaining or holding means makes itself felt, in other words, the current flowing from pole V through contact o, resistances, t, t', solenoid N to pole U of selector W holds the switch r in the position it occupied previously. When the wiper K' reaches the contact c', then the current flowing through the coil N is so weakened, or cut down to the zero level, that the switch will be returned into its original position, that is to say, that shown in the drawings.

If wiper K of the switch S is shifted from contact b to contact a there will be brought about analogously a shift of the wiper K' from contact b' to the contact a'. A given shift of the wiper K or K', respectively, however, means the tuning of the receiver apparatus to another wave-length, that is, to another broadcast station.

For exact setting or re-adjustment to a definite wave-length the contact points a' to g' may be spaced (staggered) apart.

Selector W could also be of the push-button type as shown in Fig. 1, so that, whenever a push button is operated, the adjacent station designation is rendered visible and conspicuous by illumination.

In the arrangement so far disclosed there will still exist a difference in the adjustments to a definite station that is desired according to whether the latter is approached one way or the other. The amount of this difference is a function of the width of the fixed contacts and the movable slider. It is recommendable to make the contacts as narrow as possible. But simple means may be suggested so as to make adjustment independent of the direction of tuning adjustment even with finite contact width. This is accomplishable by making the wiper freely movable between two conveniently chosen stops being in turn in rigid connection with the means to be set, rather than coupling the same rigidly with the device to be adjusted. An organization of this kind is shown in Fig. 3. Referring to the same, S denotes a slide or carriage which is attached to the cord R connected with the shaft C of the rotary condenser or condensers by way of pulleys or rollers and which is guided by the strip F. The said carriage or slide S supports a tactile lever H loosely revoluble in bearing L between two stops A1 and A2. The said lever cooperates with contacts K mounted upon a straight strip T, and each of the said contacts corresponds to a certain station. Upon movement toward the left-hand side, the said tactile lever is engaged with the right-hand stop; upon movement to the right, it is at the left stop. By suitable adjustment of the stops A1 and A2 on the slide, conditions can be made so that contacting between lever and contact is independent of the sense of adjustment.

The bottom end of the lever suitably is supported yieldingly in such a way that on passing over a contact whenever the latter did not yet correspond to the contact to which adjustment had been made at the controlling end, the lever will deflect, though will subsequently be restored to its straight position.

The connection between the tactile lever and the control line is insured most suitably by way of metallic stops A1 and A2. Closing of the control line in such case takes place safely only when the lever H actually makes contact, on the one hand, with the desired contact and, on the other hand, with the stop.

We claim:

1. In radio receiving apparatus including motor tuning means, means for remotely controlling said motor comprising an electrical network including a pair of conductors between which a voltage is maintained, a relay for controlling the operation of said tuning motor, a potentiometer connected across said two conductors, said potentiometer being provided with a number of taps arranged thereon at points corresponding to the stations desired to be tuned to from a remote point, a wiping contact device operatively connected to said motor and adapted to be operated by said motor along said taps, a substantially similar potentiometer at the remote point connected across said conductors and provided with similarly arranged taps, a common terminal at said remote point, current conducting means including said motor relay for connecting said common terminal to the wiper, a high resistance and a source of current in series connected across said relay and means at the remote point for connecting said common terminal to any one of the taps thereat.

2. In radio receiving apparatus including motor tuning means, means for remotely controlling said motor and thereby provide remote tuning of the receiver comprising a pair of conductors, between which a voltage is maintained, extending from the remote point to the point at which the receiving apparatus is located, a relay for controlling the operation of the tuning motor, a potentiometer connected across said two conductors, said potentiometer being provided with a number of taps adapted to be positioned along the potentiometer at points corresponding to the various stations to which it is desired to tune from the remote point, a wiping contact device in cooperative relationship with said taps and operatively connected with said motor so as to be operated thereby along said taps, a potentiometer connected across said conductors at the remote point, said last named potentiometer being provided with a number of taps arranged thereon at points corresponding to the stations to which the receiving apparatus is to be selectively tuned to, a common terminal at said remote point, selectively operable means connected between the common terminal and said taps for selectively connecting any one of said taps to said common point, means including said motor controlling relay for connecting said common point to the wiping contact device, and an independent energizing circuit for said motor control relay, said last named circuit being effective only when said wiping contact is not in contact wtih any of said taps.

3. An arrangement as disclosed in the next preceding claim characterized by that an alternating current voltage is maintained between said pair of conductors and by that the motor control relay comprises a polarized relay device provided with reversing contacts arranged to reverse the direction of rotation of the motor, holding contacts associated with said relay for maintaining the relay in operation when the wiping contact is not in contact with any of said taps, said holding contacts being adapted to reverse the holding potential on the relay in the same sense as the reversing contacts.

4. An arrangement as recited in claim 1 characterized by that the wiping contact device is arranged so as to be capable of free motion between two stops fixedly connected with the motor.

GOTTFRIED VOGT.
HANS STIERHOF.